Jan. 8, 1952  R. H. RILEY, JR., ET AL  2,581,445
ARMATURE LEAD CONNECTION
Filed Oct. 6, 1949
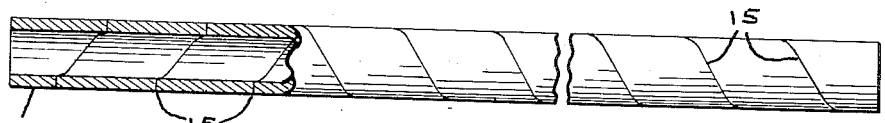
FIG. 4.
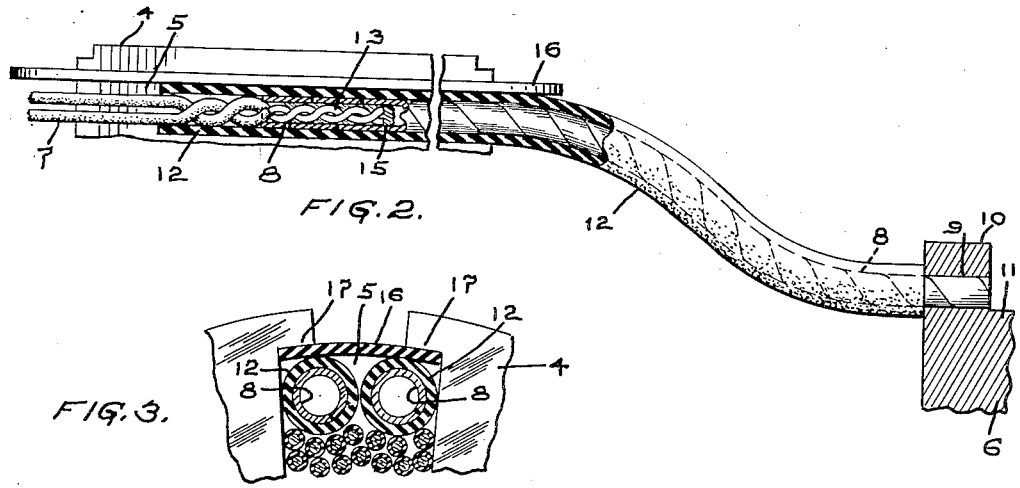
FIG. 2.
FIG. 3.
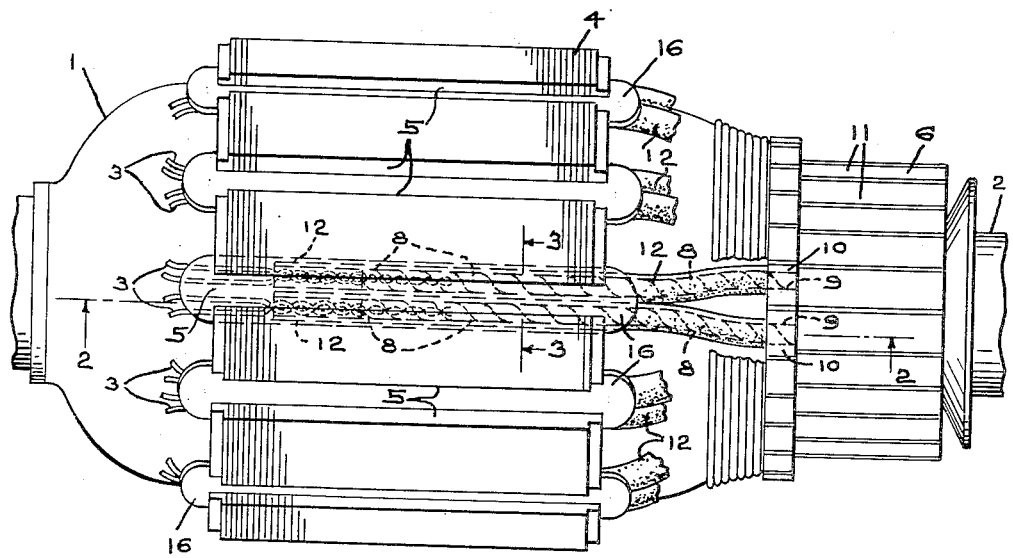
FIG. 1.
Inventors
Robert H. Riley, Jr. and
Alonzo G. Decker, Jr.
By Thomas W. Y. Clark
Attorney Patented Jan. 8, 1952

2,581,445

UNITED STATES PATENT OFFICE 2,581,445

ARMATURE LEAD CONNECTION

Robert H. Riley, Jr., and Alonzo G. Decker, Jr., Towson, Md., assignors to The Black and Decker Manufacturing Company, a corporation of Maryland Application October 6, 1949, Serial No. 119,865

11 Claims. (Cl. 171—252)

This invention relates to improvements in the armature of a rotary electric machine.

In the winding of the armatures of rotary electric machines, relatively fine wires are used in order to get the proper number of turns in the core slots. When the leads of such fine wires are brought out and attached to the commutator bars they have a tendency to crystallize and break. This is particularly true in the use of such armatures in motors which are subject to vibration, such as the motors of electric hammers. Various suggestions for connecting the fine wires with a considerably larger element which is then attached to the commutator bars have been made, but those lead connections heretofore available still crystallize and break under the hammering action to which the motors are subjected in certain tools.

The object of the present invention is to make an armature lead connection and to embody it in the armature in such a way that it will withstand the vibration to which it is subjected in portable electric hammers. The armature lead connection is preferably of a tubular formation and it has entering it at one end the lead wires of the windings and it is held securely in the armature, preferably in the slots of the core, from which it is insulated, and it then enters an opening in the commutator bar to which it is preferably soldered. The tubular connector of the present invention is made of a conducting element preferably comprising one or more members wound side-by-side to form a helix and in the preferred form the conducting element member or members forming the helix are not only rectangular but are flat thin rods wound with their longitudinal edges contiguous into single thickness tubular formation.

The above and other objects and advantages of the invention will be apparent from the following description and the accompanying drawing forming a part hereof and in which:

Figure 1 is a top plan view of the armature of an electric motor showing the improved lead connection.

Figure 2 is a longitudinal sectional view on line 2—2 of Figure 1.

Figure 3 is a transverse sectional view on line 3—3 of Figure 1.

Figure 4 is an elevational view of the lead connection, partly in section.

In the drawings similar numerals refer to similar parts throughout the several views.

The armature 1 having shaft 2 has the usual windings of fine wire which terminate at 3. The armature has the usual laminated iron core 4 slotted at 5 and the commutator 6. The fine wires 3 leading from the respective windings are preferably twisted as shown at 7 and inserted into the relatively larger lead connection 8 to which they are preferably soldered. This lead connection 8 in turn is inserted in opening 9 in the head 10 of the respective commutator bars 11 to which it is preferably soldered. The lead connection is covered with an insulating tube 12 which extends back over the insulation on the individual wires 3 of the windings which are of course skinned as at 13 prior to their entry into the lead connection. The lead connection, although it may be round, in its preferred form is made of a rectangular strip or rod of relatively thin metal, preferably beryllium copper, which is wound into a helix with the sides of the strip preferably contiguous or butting against each other, as at 15. It will also be apparent that the connection may comprise a plurality of parallel strips or wires wound side by side into a helix to form a single tube of one thickness.

Two of these lead connections attached to the respective winding leads are placed in each slot of the core and a strip of insulating material 16 is forced into the slots and is held down on the connections by means of the shoulders 17 of the core projecting over the slots, the strip 16 in turn firmly holding the lead connections in the slots.

The wires of the windings being insulated, the sleeve or insulation 12 around the lead connection, insulates the connection from the wires and from the core though laid next to the wires in the slots as shown in Figures 2 and 3.

While there has been illustrated and described a particular embodiment of the invention, modifications thereof will occur to those skilled in the art. The invention is not to be limited to the particular arrangement disclosed, but is intended to cover all modifications within the spirit and scope of the appended claims.

What is claimed as new and is desired to be secured by Letters Patent is:

1. A rotary electric armature including a core having winding slots therein, insulated conductor wires forming windings in said slots, a commutator, tubular lead connections from the windings to the corresponding commutator bars each comprising a conducting member wound in a helix, tubular insulation enclosing said tubular lead connection, the connection being seated in and closely engaged within a core slot, the tubular insulation engaging the insulation of the core windings, said connection being chambered at one end to receive a pair of conductor lead wires, said wires being inserted and metallically connected therein, the other end of the connection being secured to a commutator bar head, each said helix being hollow and carrying the full current of its respective winding.

2. The armature of claim 1 in which the conducting member has a rectangular cross-section, the member being wound with the sides contiguous into a continuous tube.

3. A lead connection from the coils to the commutator bar of a rotary electric armature comprising a conducting member wound in a helix metallically connected at one end to a commutator bar, and at the other end to the coil wires corresponding to said bar taken from the rear of the coil and inserted within said other end of the connection, and an insulating sleeve enclosing the connection and contacting the insulation of the adjacent coils of the armature, the insulated sleeves being seated in core slots of the armature and fitting closely therein, each said helix being hollow and carrying the full current of its respective coil.

4. The lead connection of claim 3 in which the conducting member is wound with sides contiguous into a continuous tube.

5. The lead connection of claim 3 in which the conducting member is a flat rod wound with sides contiguous into a continuous tube.

6. A lead connection from the coils to the commutator bar of a rotary electric armature comprising conducting members wound in a helix connected at one end to a commutator bar and at the other end to the coil wires corresponding to said bar and inserted within and metallically connected to the said other end of the connection and insulation enclosing said connection and contacting the insulation of adjacent coils of the armature, the insulated connection being seated in a core slot of the armature and fitting closely therein, each said helix being hollow and carrying the full current of its respective coil.

7. Lead connections for a rotary electric armature having coils and a slotted core, comprising conducting members wound in a helix connected to the lead wires of the coils, secured in said slots and extending therefrom to the respective commutator bars to which they are electrically connected, and insulation around said connections to insulate them from the adjacent coils of the armature, each said helix being hollow and carrying the full current of its respective coil.

8. The lead connection of claim 7 in which the conducting members are wound contiguously to one another into a continuous tube.

9. The lead connection of claim 7 in which the conducting members are flat rods wound with sides contiguous into a continuous tube.

10. A lead connection from the coils to the commutator bars of a rotary electric armature said connection comprising conducting members wound in a helix, secured and electrically connected at one end to a commutator bar, external insulation on the connections and the connections having a support on the armature for a portion of the helix spaced from the commutator bar, the coil ends corresponding to the bar being electrically connected to the connection at the end opposite the connection to the commutator bar, each said helix being hollow and carrying the full current of its respective coil.

11. Lead connections for a rotary electric armature having coils and a slotted core comprising a conducting member wound in a helix of a cross-section largely in excess of the cross-section of the coil wires and at one end enclosing and being electrically connected to the lead wires of the coils, the connection being secured in said slots and extending therefrom to the respective commutator bars to which they are electrically connected, and an insulating tube around said connections to insulate them from the adjacent coils of the armature, each said helix being hollow and carrying the full current of its respective coil.

ROBERT H. RILEY, Jr.
ALONZO G. DECKER, Jr.

REFERENCES CITED

The following references are of record in the file of this patent:

UNITED STATES PATENTS

| Number | Name | Date |
|---|---|---|
| 380,157 | Acheson | Mar. 27, 1888 |
| 1,645,296 | Rudenberg | Oct. 11, 1927 |
| 2,078,024 | Roth | Apr. 20, 1937 |

FOREIGN PATENTS

| Number | Country | Date |
|---|---|---|
| 521,019 | Great Britain | May 9, 1940 |